United States Patent [19]

Tamada et al.

[11] Patent Number: 4,822,990

[45] Date of Patent: Apr. 18, 1989

[54] ADMISSION CONTROL SYSTEM HAVING A TRANSPONDER ACTUATED BY AN INQUIRY SIGNAL

[75] Inventors: Masuo Tamada, Kanagawa; Tsutomu Tanaka, Tokyo; Hideo Matsuoka, Kanagawa, all of Japan

[73] Assignee: Kabushiki Kaisha Toshiba, Kawasaki, Japan

[21] Appl. No.: 932,596

[22] Filed: Nov. 20, 1986

[30] Foreign Application Priority Data

Nov. 29, 1985 [JP] Japan ................. 60-269159

[51] Int. Cl.$^4$ ............................................. G06K 19/00
[52] U.S. Cl. ................... 235/492; 235/380; 340/825.31; 340/825.32
[58] Field of Search ................. 235/492, 380; 340/825.31, 825.32, 825.44

[56] References Cited

U.S. PATENT DOCUMENTS

| | | | |
|---|---|---|---|
| 3,652,827 | 3/1972 | Inoue et al. | 235/488 |
| 3,701,100 | 10/1972 | Yarbrough | 340/825.31 |
| 4,006,459 | 2/1977 | Baker et al. | 340/825.31 |
| 4,338,601 | 7/1982 | Nance-Kivell | 340/825.35 |
| 4,378,551 | 3/1983 | Drapac | 340/825.44 |
| 4,384,288 | 5/1983 | Walton | 340/825.34 |
| 4,692,762 | 9/1987 | Lewiner et al. | 340/825.31 |

*Primary Examiner*—Philip H. Leung
*Attorney, Agent, or Firm*—Oblon, Fisher, Spivak, McClelland & Maier

[57] ABSTRACT

An admission control system including a portable medium which is equipped with a transponder that is actuated and powered by an inquiry radio wave and sends out an identifying code signal as a radio wave, a transmission device which is provided at a gateway to a place to which admittance is to be gained by only specific persons, and at the gateways to specific areas within the place, and so on, the transmission device transmits an inquiry radio wave, upon detecting the passage of the gateway by a person who carries the portable medium. The admission control system receives an identifying code signal from the portable medium that is transmitted in response to the inquiry radio wave, admits the bearer of the portable medium card to the place only when the identifying code coincides with the identifying code at the gate, and confirms the position of the person within the place.

11 Claims, 6 Drawing Sheets

TABLE 1

| PERSONAL CODE | NAME | CARD NO. | AB-SENCE | AREA A1 | AREA A2 | | AREA AN |
|---|---|---|---|---|---|---|---|
| | | 0 0 0 1 | 1 | 0 | 0 | | 0 |
| | | 0 0 0 2 | 0 | 1 | 0 | | 0 |
| | | 0 0 0 3 | 0 | 0 | 0 | | 1 |
| | | | | | | | |
| | | n n n n | 0 | 0 | 1 | | 0 |

ADMISSION CONTROL SYSTEM HAVING A TRANSPONDER ACTUATED BY AN INQUIRY SIGNAL

BACKGROUND OF THE INVENTION

1. Field of the Invention

The present invention relates to a control system, for instance, for a place to which admission of specific persons alone is permitted.

2. Description of the Prior Art

In an admission control system for a meeting place admittance to which is gained by specific persons alone such as athletes, officers etc. (for instance, an Olympic game facility or an international conference hall), it has been general heretofore to request the presentation of the ID card and grant admittance only when the bearer's identity is established. Moreover, admittance to specific areas within the meeting place are similarly granted only to those whose identities are confirmed.

However, in the conventional admission control system as above, ID cards have to be checked individually and manually so that it is very troublesome, and it can happen that persons without ID cards are also admitted due to mistakes in confirmation.

On the other hand, once a person is admitted to the meeting place, his moving route cannot at all be grasped, and hence, it used to be extremely difficult to seek out a specific person attending.

SUMMARY OF THE INVENTION

To overcome the problems mentioned above, an object of the present invention is to provide an admission control system which can carry out exactly the control of the persons attending without requiring any manual work and can readily check the moving positions of the person within the meeting place.

In order to achieve the above object, the present invention is characterized in that it has a portable medium equipped with a transponder that is and powered by the power induced by an inquiry radio wave and sends out a radio wave of a identifying code signal, transmitting means which is provided at the gateway to the meeting place admittance to which may be gained only by specific persons and also at the gateways to specific areas within the meeting place, and so on, to transmit the inquiry radio wave, and admission control means which receives an identifying code signal from the portable medium which is transmitted in response to the inquiry radio wave, admits the person to the meeting place only when the received identifying code signal coincides with the identifying code signal at the gate, and confirms the position of the person within the meeting place.

BRIEF DESCRIPTION OF THE DRAWINGS

These and other objects, features and advantages of the present invention will be more appratent from the following description of a preferred embodiment taken in conjunction with the accompanying drawings in which.

DESCRIPTION OF THE PREFERRED EMBODIMENT

Figure 1:
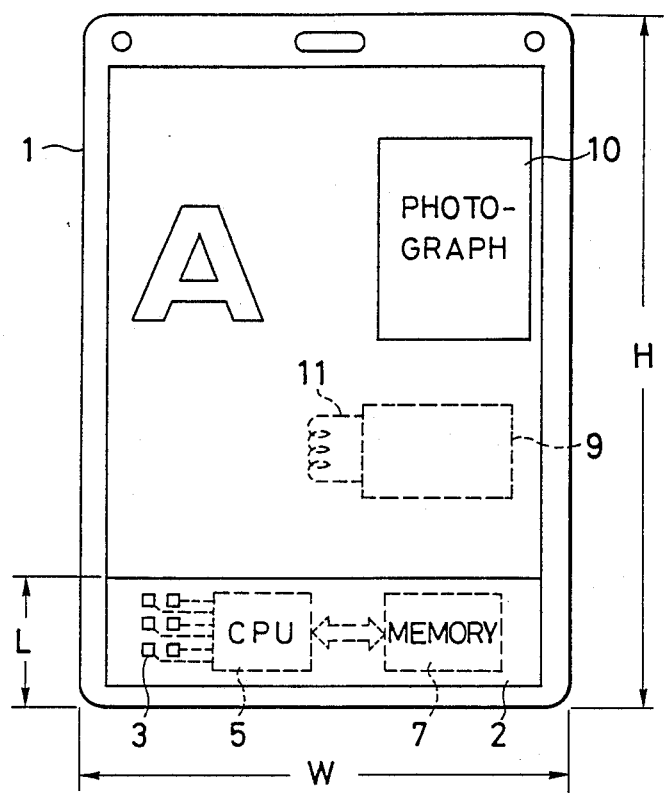
FIG. 1 is a block diagram which shows an example of ID card used for the admission control system in accordance with the present invention.

In FIG. 1 is shown an example of ID card which is used for the admission control system of the present invention. The ID card 1 is constructed by embedding a transponder 9 in an IC card. At a prescribed position on the surface, there is pasted a photograph 10 of the bearer of the card.

The ID card 1 has dimensions of a width W of about 100 mm, a length H of about 140 mm, and is shaped in the form of a thin plate with a thickness of about 1 to 2 mm. The region of the lower edge portion with a length of L (about 15 mm) of the ID card 1 is an IC card section 2.

The IC card section 2 is similar to the conventional IC card, having a plurality of external input and output terminals 3, a CPU 5, and a memory 7, and the data that are input and output from the card reader/writer via the terminals 3 are written in and read out from the memory 7 under the control of the CPU 5.

Figure 2:
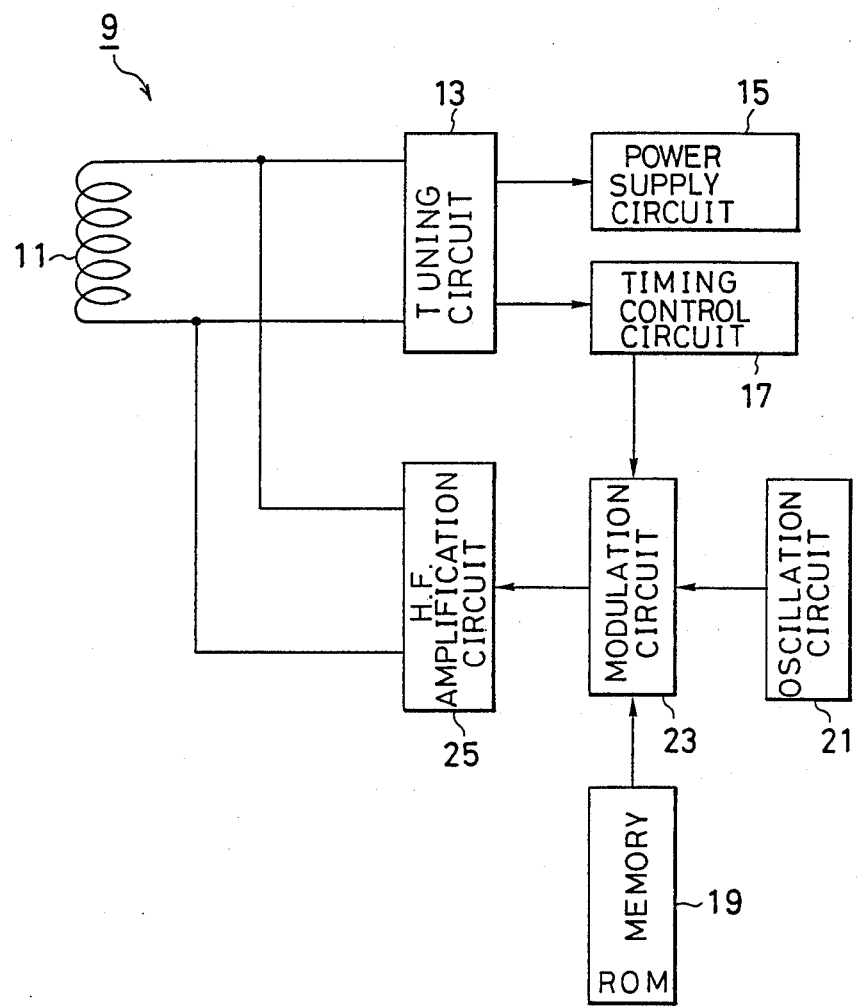
FIG. 2 is a circuit diagram which shows the configuration of the transponder used for the ID card.

At a predetermined area of the ID card, there are embedded a transponder 9 which is formed by an integrated circuit. In FIG. 2 is shown the circuit configuration of the transponder 9.

When an inquiry radio wave with a predetermined frequency from the outside is received by a coil 11, a high frequency signal that is induced in the coil 11 passes through a tuning circuit 13 and is input to a power supply circuit 15 and a timing control circuit 17. The power supply circuit 15 rectifies and smoothes the high frequency signal to produce a DC voltage which is output to the following circuits as the power supply. Namely, the transponder does not have a built-in power supply, and is actuated by the power induced in the coil 11 by receiving radio waves from the outside. The timing control circuit sends a start signal that commands the start of the modulation operation and clock signals to a modulation circuit 23 that will be described later, after receiving the high frequency signal for more than fixed length of time.

The memory 19 is a ROM in which is stored personal identification information for identification in binary coded signal according to a prescribed format.

The modulation circuit 23 successively reads the personal identification code bit by bit from the memory 19, tuning with the start signal and the clock signals. The modulation circuit 23 modulates the output of an oscillation circuit 21 in accordance with the signal that is read, and supplies the modulated high frequency signal to a high frequency amplification circuit 25. The amplified high frequency signal is impressed to the coil 11, and is radiated to the outside as a radio wave.

For instance, a frequency modulated signal may be prepared by assigning 11 MHz corresponding to "0" of the personal identification code and 12 MHz corresponding to "1" to radiate it to the outside. The frequencies of the radio wave that includes the personal identification information and the inquiry radio wave which causes the transponder 9 to be actuated are selected to have different values.

Figure 3:
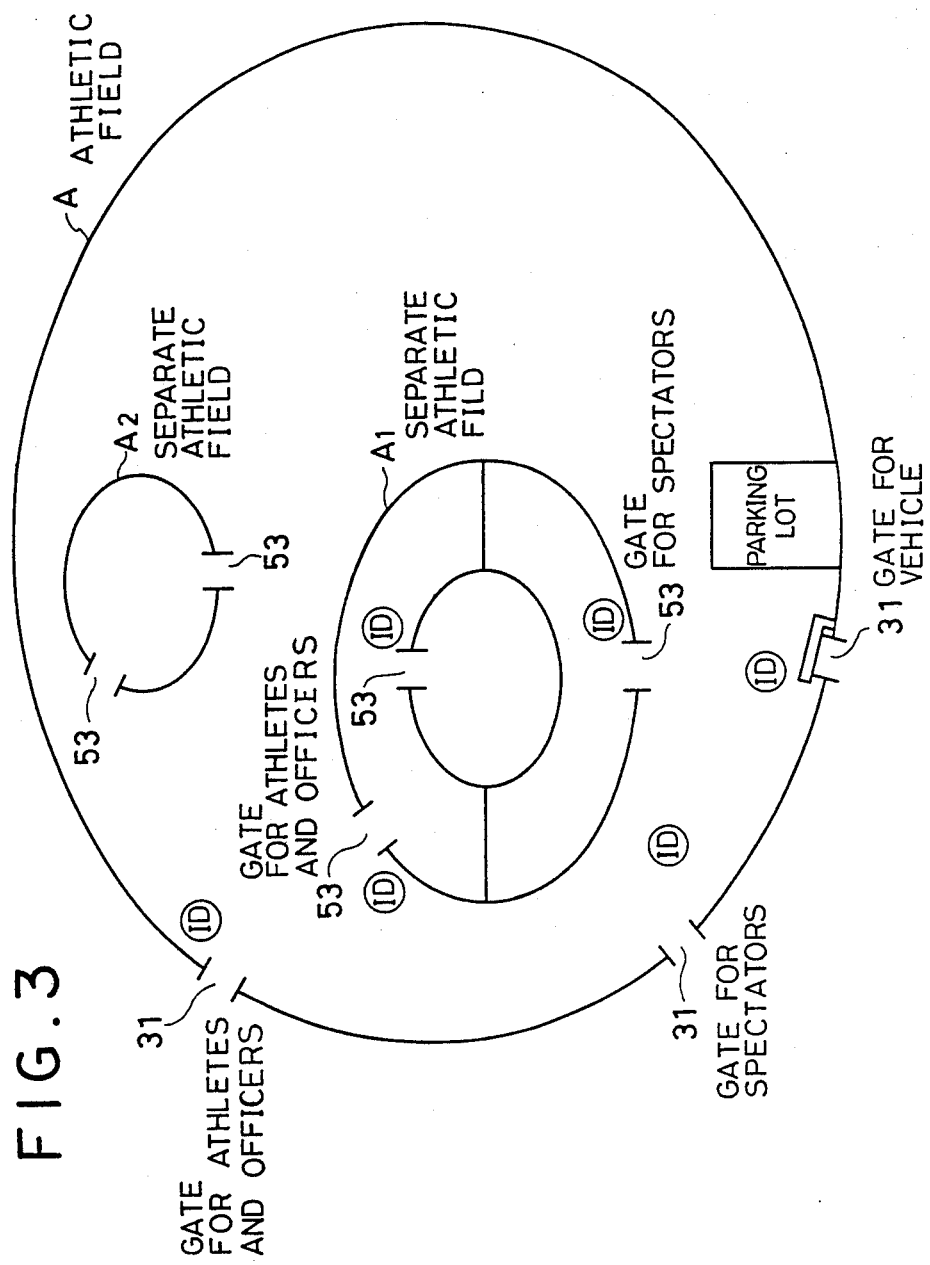
FIG. 3 is a schematic diagram which shows an example of the athletic fields to which is applied the admission control system of the present invention.
Figure 4:
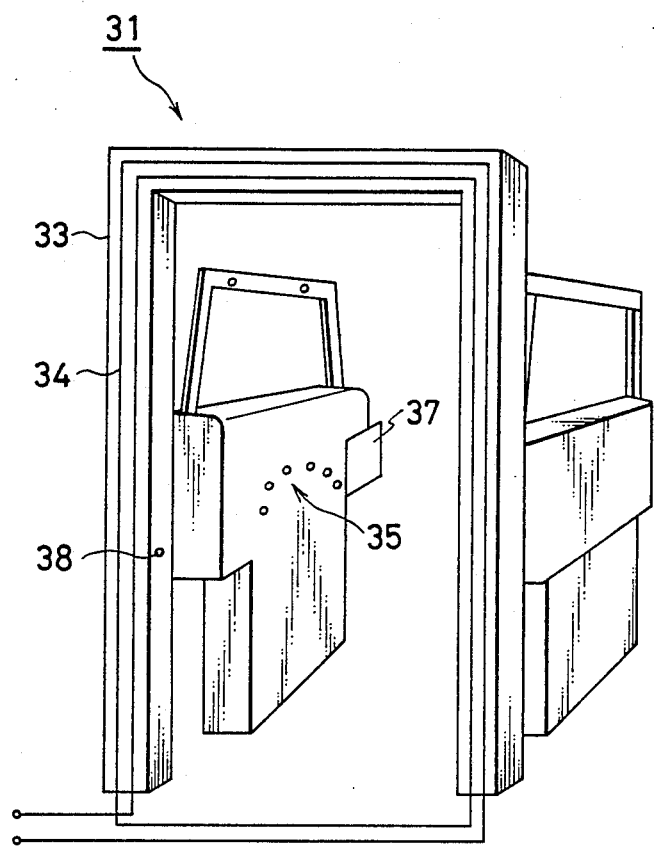
FIG. 4 is a perspective view which shows an example of the ID gate for controlling the entrance and exit.

In FIG. 3 is shown an example of athletic fields to which is applied the admission control system of the present invention.

The athletic fields A consist of a plurality of separate athletic fields $A_1$, $A_2$, and so on. At each gate to the athletic fields A, there is installed an ID gate 31 for controlling entrance and exit.

Figure 5:
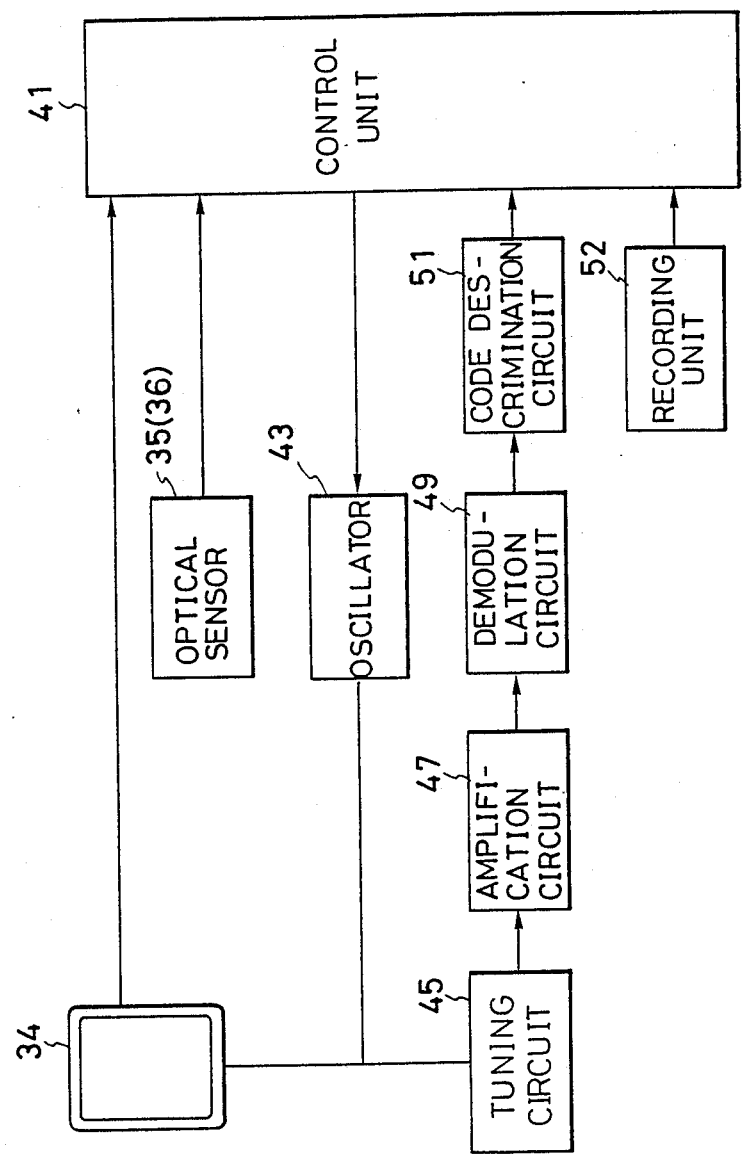
FIG. 5 is a block diagram which shows the configuration of an apparatus which judges the identifying code sent from the ID card at the ID gate.

The entrance and exit control gate 31 includes a gate section 33 in which is buried a coil 34, a plurality of optical sensors, disposed in the direction of motion, that are provided on both sides of the ID gate 31, and a door 37. FIG. 5 shows its control circuit.

When a bearer of the ID card traverses the gate section 33, the optical sensor 38 buried in the gate section 33 detects it and transmits a detection signal to a control unit 41. In response to this, the control unit 41 causes the oscillator 43 to operate and sends out an inquiry radio wave from the coil 34. In this way, the identifying code signal sent out from the ID card is transmitted to a code discrimination circuit 51 via the coil, tuning circuit 45, amplification circuit 47, and demodulation circuit 49, as described earlier. At the code discrimination circuit 51, the identifying code signal received from the ID card is checked against the identifying code at the gate which has been stored there beforehand to judge the coincidence of the codes, and opens the door 37 when both codes coincide. In this manner, admittance of the bearer of the ID card to the athletic fields A is granted.

In addition, the direction of motion of the bearer of the ID card can be detected. Namely, it can be detected by the order in which the irradiating light of the plurality of optical sensors 35 is intercepted.

Figure 6:
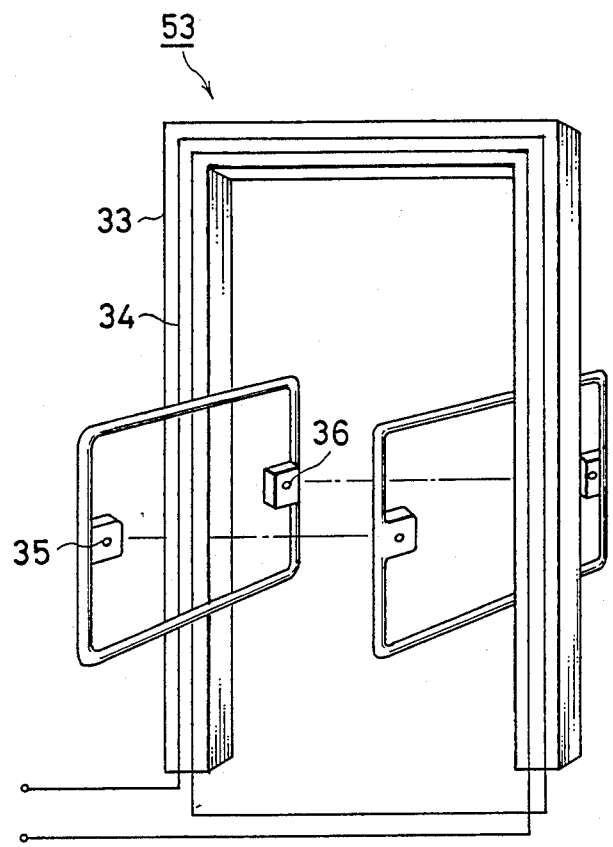
FIG. 6 is a perspective view which shows an example of a simplified ID gate; and Table 1 is a table which shows an example of the admission control situation for the athletic fields of FIG. 3.

A bearer of the ID card 1 thus admitted to the field passes through a simplified ID 53 as shown in FIG. 6 in making entrance to the separate athletic field $A_1$ or $A_2$.

The simplified ID gate 53 includes a coil 34 which is built in the gate section 33 and two sets of optical sensors 35 and 36. Differing from the entrance and exit control ID gate 31, there is not provided a door 37. Namely, when a bearer of the id card goes through the simplified ID gate, an inquiry radio wave is sent out from the coil 34 as mentioned earlier, and corresponding to this, an identifying code signal is sent out from the ID card 1. The code in the identifying code signal that is received is discriminated in the code discrimination circuit 51. Then, the identifying code thus discriminated is memorized in a recording section 52.

Further, from the order in which the optical sensors 35 and 36 are detected, when the bearer of the ID card 1 goes through the ID gate, the direction of motion of the bearer of the ID card can be judged.

In this way, by retrieving the identifying code that is memorized in the recording section 52, it can easily be discriminated whether the bearer of the ID card 1 is now in the athletic fields or already left the facilities, and in the case when he is still in the athletic fields, the position in the athletic fields where he is. Because of this, even when a specific person is to be searched within the athletic fields, the area for search can be narrowed down, and the paying announcement and others need not be given over the entire area of the athletic fields neither.

Table 1 shows the whereabouts of each of numerous bearers of the ID cards within the athletic fields A of FIG. 3 in terms of the binary coded signals. It can easily be judged from the table that the bearer of card No. 2 is in area (separate athletic field) $A_1$ and bearer of card No. 3 is in area $A_N$. Further, it is possible to make the code number or the name of each individual to correspond to the ID card number. Moreover, by attaching the ID card to such a place as the bottom of individual motor vehicle and by varying the positions of the gate section to correspond to the attaching positions of the ID cards, it becomes possible to detect the whereabouts, entrance and exit, and so on, of the motor vehicles that have the ID cards on.

On the other hand, the ID card 1 may also be used as an IC card. Namely, when the bearer of an ID card have shoppings, for instance, in the athletic fields A, data related to shoppings can be memorized in the IC card section 2 of the ID card 1, by simply inserting the IC card to the card reader/writer that is installed at each shop, so that it becomes possible to do cashless shoppings. In addition, by writing in advance personal information such as the health monitoring information or other necessary information in the memory of the IC card section 2, it becomes unnecessary to bring such documents into the athletic fields A, which is very convenient.

Although in the present embodiment a configurataion is shown in which the simplified ID gate 53 is provided at the gates of the separate athletic fields $A_1$ and $A_2$, the present invention is not limited to such a configuration alone, and it may be provided at appropriate spots such as the paths and booths within the fields.

Further, in FIG. 5, an example is shown in which the control unit 41 is provided separately at gates 31 and 53. However, an arrangement may be made to provide the control unit 41 at one place to control centrally the gates 31 and 53.

As described in the foregoing, according to the present invention, a portable medium, which has a transponder that sends out an identifying code for personal identification as a radio wave, is used, for example, as an ID card. In making access to a meeting place admittance to which is gained only by specific persons, it is arranged that admittance is granted only when there is established a coincidence of identifying code signals. Therefore, it becomes possible to control the admission securely without involving any manual work.

Further, the position of the person in specific areas within the meeting place can be confirmed so that it is easy to identify the position of the person within the meeting place.

What is claimed is:

1. An admission control system for administering a controllable admission of a selected person to a place provided with at least one primary entrance to the place and subdivided into at least two sections, each section being provided with at least one secondary entrance to the section, the admission control system comprising:

portable means including a transponder to be carried by the person, for generating an identification code assigned to the portable means, in response to a reception of an inquiry radio wave which actuates the transponder;

primary admission control means to be located at the primary entrance, for granting an admission to the person, including:
first radio wave transmitter means for transmitting the inquiry radio wave,
first receiver means for receiving the identification code from the portable means when said identificatio code is generated by said portable means in response to said inquiry radio wave generated by said first radio wave transmitter means,
first memory means for memorizing admissible identification code, and
first gate means for granting admission to the person only when the identification code from the portable means carried by the person coincides with one of the admissible identification codes memorized in the first memory means;
secondary admission control means to be located at the secondary entrances for detecting a passage of the person, including:
second radio wave transmitter means for transmitting the inquiry radio wave,
second receiver means for receiving the identification code from the portable means when said identification code is generated by said portable means in response to the inquiry radio wave generated by said second radio wave transmitter,
second gate means for detecting the passage of the person, and
second memory means for recording the identification code received by the second receiving means and the passage detected by the second gate means; and
means for determining the location of the person within the place based at least in part on the identification code recorded in the second memory means.

2. The admission control system of claim 1, wherein the portable means is an IC card.

3. The admission control system of claim 1, wherein the transponder includes:
first coil means for receiving the inquiry radio waves from the first and second radio wave transmitter means;
tuning circuit means for tuning to the inquiry radio waves received by the first coil means;
power supply circuit means for generating a DC current by rectifying and smoothing the inquiry radio waves received by the first coil means;
timing control circuit means for producing a start signal and clock signals;
oscillator means for generating a high frequency output signal;
third memory means for memorizing the identification code of the portable means;
modulatio circuit means for reading the identification code from the third memory means in a timing given by the start signal and the clock signals, and for modulating the high frequency output signal in accordance with the identification code; and
high frequency amplifier means for amplifying the modulated high frequency output signal, and for applying the amplified high frequency output signal to the first coil means.

4. The admission control system of claim 1, wherein the first receiver means comprises a coil to be located the primary entrance, and wherein the first gate means includes a door which opens only when the person is granted admission, and wherein the primary admission control means further comprises a plurality of optical sensor means arranged along the passage to the primary entrance for detecting an approach of the person, to the primary gate means.

5. The admission control system of claim 4, wherein the plurality of optical sensor means produces a detection signal when detecting the approach of the person, and wherein the first gate means further includes:
control unit means for activating the first gate means in response to the detection signal from the plurality of optical sensor means;
tuning circuit means for tuning to the identification code received by the first receiver means;
amplifier means for amplifying the tuned identification code;
demodulation circuit means for demodulating the amplified identification code; and
code discrimination circuit means for performing a code discrimination by comparing the demodulated identification code with the admissible identification codes memorized in the first memory means.

6. The admission control system of claim 5, wherein each of said plurality of optical sensor means includes means for projecting light and means for detecting the projected light, and the primary admission control means further comprises:
means for detecting the direction of the passage of the person from the order in which lights projected by the plurality of light projecting means of the plurality of optical sensor means are obstructed and therefore not detected by the respective light detecting means of said plurality of optical sensor means.

7. The admission control system of claim 1, wherein the second receiver means comprises a coil to be built in the secondary entrance, and wherein the secondary admission control means further comprises a plurality of optical sensor means arranged along the passage to the secondary entrance for detecting an approach of the person to the second gate means.

8. The admission control system of claim 7, wherein the plurality of optical sensor means produces a detection signal when detecting the approach of the person, and wherein the second gate means further includes:
control unit means for activating the second gate means in response to the detection signal from the plurality of optical sensor means;
tuning circuit means for tuning to the identification code received by the second receiver means;
amplifier means for amplifying the tuned identification code;
demodulation circuit means for demodulating the amplified identification code; and
code discrimination circuit means for performing a code discrimination by comparing the demodulated identification code with the admissible identification codes memorized in the first memory means.

9. The admission control system of claim 8, wherein each of said plurality of optical sensor means includes means for projecting light and means for detecting the projected light, and the second gate means further comprises:
means for detecting the direction of the passage of the person from the order in which lights projected by the plurality of light projecting means of the optical sensor means are obstructed and therefore not detected by the respective light detecting means of said plurality of optical sensor means.

10. The admission control system of claim 1, wherein the second memory means also records an address of a section where the person is presently located in terms of a binary code.

11. The admission control system of claim 1, wherein said means for determining the location of the person within the place includes means for determining said location also based on the passage recorded in the second memory means.

* * * * *